United States Patent
Guerra (10) Patent No.: US 7,308,338 B2
(45) Date of Patent: *Dec. 11, 2007

(54) ROBOTIC ARM FOR USE WITH PHARMACEUTICAL UNIT OF USE TRANSPORT AND STORAGE SYSTEM

(75) Inventor: Lawrence E Guerra, Overland Park, KS (US)

(73) Assignee: ScriptPro, LLC, Mission, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/466,627

(22) Filed: Aug. 23, 2006

(65) Prior Publication Data

US 2006/0287771 A1 Dec. 21, 2006

Related U.S. Application Data

(63) Continuation of application No. 10/996,256, filed on Nov. 23, 2004, now Pat. No. 7,175,381.

(51) Int. Cl.
*G06F 19/00* (2006.01)
(52) U.S. Cl. ............... 700/245; 700/258; 700/259; 700/261; 901/12; 901/15; 901/28
(58) Field of Classification Search ............. 700/245, 700/258, 259, 261; 414/744.5; 74/490.05; 901/12, 15, 28; 318/568.12
See application file for complete search history.

(56) References Cited

U.S. PATENT DOCUMENTS

| | | | |
|---|---|---|---|
| 6,351,690 B1 * | 2/2002 | Lenz | 700/245 |
| 6,658,324 B2 * | 12/2003 | Bancroft et al. | 700/245 |
| 7,096,091 B2 * | 8/2006 | Haas et al. | 700/245 |
| 2006/0259195 A1 * | 11/2006 | Eliuk et al. | 700/245 |

* cited by examiner

Primary Examiner—Thomas Black
Assistant Examiner—McDieunel Marc
(74) Attorney, Agent, or Firm—Hovey Williams, LLP (57) ABSTRACT

A robotic arm (10) for use with a pharmaceutical unit of use transport and storage system (200) comprises a base plate (14) with a first cam track segment (16) and a second cam track segment (18). A first arm segment (20) is rotatably attached to the base plate (14) and a second arm segment (26) is rotatably attached to the first arm segment (20) and includes a cam track follower (110) that engages with the first and second cam track segments (16, 18) to guide the movement of the second arm segment (26). A platform (36) is secured to an end of the second arm segment (26) and is adapted to engage a product (214). A series of orientation sprockets (102, 124, 126, 142) and drive chains (148, 150) cooperate to maintain the platform (36) rearwardly oriented as the arm (10) extends from a retracted position to an extended position.

30 Claims, 11 Drawing Sheets

ROBOTIC ARM FOR USE WITH PHARMACEUTICAL UNIT OF USE TRANSPORT AND STORAGE SYSTEM

RELATED APPLICATION

The present application is a continuation patent application and claims priority benefit, with regard to all common subject matter, of earlier-filed U.S. nonprovisional patent application titled "ROBOTIC ARM FOR USE WITH PHARMACEUTICAL UNIT OF USE TRANSPORT AND STORAGE SYSTEM", Ser. No. 10/996,256, filed Nov. 23, 2004 now U.S. Pat. No. 7,175,381. The identified earlier-filed application is hereby incorporated by reference into the present application. The present application is also related to co-pending U.S. Patent Application "FORK BASED TRANSPORT STORAGE SYSTEM FOR PHARMACEUTICAL UNIT OF USE DISPENSER", Ser. No. 10/896,477, filed Jul. 22, 2004; and U.S. Pat. No. 6,883,681, titled "AUTOMATIC DISPENSING SYSTEM FOR UNIT MEDICAMENT PACKAGES", both of which are incorporated into the present application by reference.

BACKGROUND OF THE INVENTION

1. Field of the Invention

The present invention relates to the field of medicament dispensing systems. More particularly, the invention relates to a robotic arm for use in a system that automatically stores and dispenses pre-packaged pharmaceutical products and other products, wherein the robotic arm is compatible with closely spaced, densely packed product shelves.

2. Description of the Prior Art and Related Co-Pending Application

Pharmacists spend an increasing amount of time educating patients about proper use and handling of medicaments and pharmaceuticals. While this trend toward more patient counseling increases patients' knowledge about medicaments and decreases improper use of medicaments, it leaves less time for pharmacists to fill and dispense medicaments.

Automatic medicament dispensing systems, such as the one disclosed in U.S. Pat. No. 5,337,919 (hereinafter referred to as the "'919 patent"), have been developed to assist pharmacists in filling and dispensing prescriptions and to therefore have more time for patient counseling. The system described in the '919 patent is extremely effective for filling and dispensing medicaments in the form of pills and capsules, but is not designed to dispense larger pre-packaged pharmaceuticals. Pharmacists in many areas dispense large quantities of pre-packaged boxes and/or bottles of pharmaceuticals and currently must manually locate and dispense these items, reducing the amount of time those pharmacists have for patient counseling.

Another problem with manually locating and dispensing pre-packaged pharmaceuticals is that errors are sometimes made. For example, many boxes of pre-packaged pharmaceuticals look alike even though they have different strengths or quantities of medicaments therein. Pharmacists therefore occasionally locate and dispense the wrong box. Such errors can obviously have serious consequences for patients receiving such products.

Additionally, as some packages of pharmaceuticals may be of different sizes and/or shapes, mechanical devices often have difficulty gripping individual packages. Furthermore, in gripping a package, a mechanical device may disturb other packages, making future retrieval of those disturbed packages more difficult.

Automated systems have been developed which more effectively store products on shelves. One such medicament storage system is disclosed in U.S. Pat. No. 6,883,681, titled "AUTOMATIC DISPENSING SYSTEM FOR UNIT MEDICAMENT PACKAGES" and incorporated into the present application by reference. This system includes a product transporter with a conveyor belt on the transporter. The transporter acquires a product when positioned so that an end of the transporter conveyor belt is proximate, for example, an end of an infeed conveyor belt. The product is transferred from the infeed conveyor belt to the transporter conveyor belt when both belts are rolling in the same direction so that the product engages the transporter conveyor belt as it reaches the end of the infeed conveyor belt. While this system is effective for use with certain products, it is not ideal for use with products contained in narrow packages that may wobble and/or overturn as they encounter a narrow gap when passing from one conveyor belt to another, disrupting the storing or dispensing process.

Figure 1:
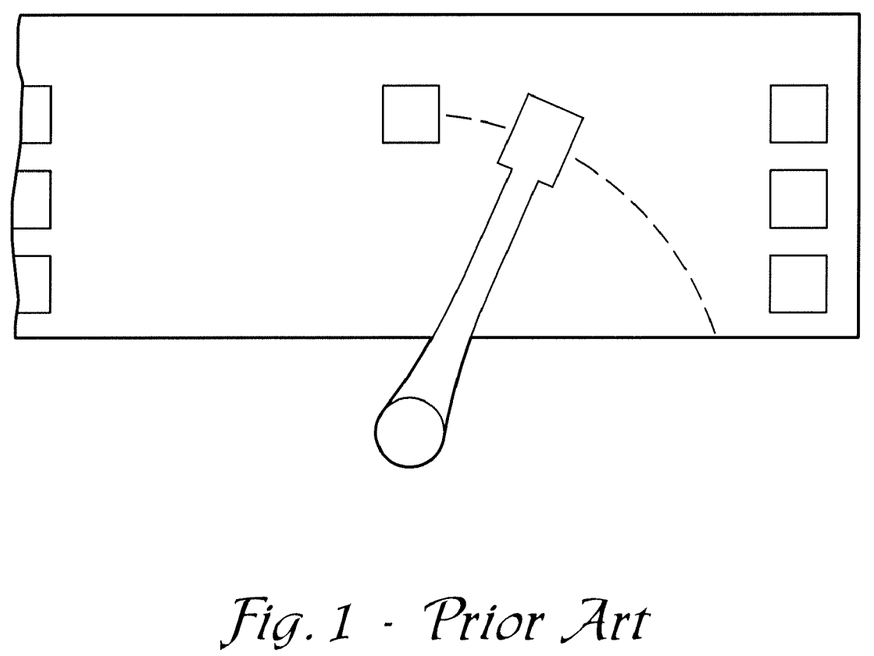
FIG. 1 is a plan view of a prior art robotic arm.

Furthermore, systems such as that disclosed in the '919 patent are not adapted to store products on shelves so that the products are in close proximity to each other. Gripping arm mechanisms such as the manipulator arm and gripping fingers of the '919 patent are not well adapted for reaching onto a shelf, particularly a deep shelf, to place or remove a product. The arm of the '919 patent, for example, is not long enough to place products on, or remove products from, a back portion of a shelf. While similar arms with greater length may be used to reach farther onto a shelf, such a design reduces the number of products that can be stored on the shelf. An arm with greater reach requires more lateral shelf space to operate, as illustrated in FIG. 1, which requires the products to be stored farther apart. As the length of the arm increases, so does the radius of curvature of the path followed by the end of the arm. Similarly, if the arm is made to pivot up and away from a shelf, the shelves must be placed further apart to accommodate the swing path of the arm. Accommodating the increased operating space of such systems results in less densely packed products, product shelves spaced farther apart, and/or shelves with less depth.

Accordingly, there is a need for an improved medicament dispensing system that overcomes the limitations of the prior art. More particularly, there is a need for a medicament dispensing system for automatically storing and dispensing a variety of pre-packaged pharmaceutical boxes and/or bottles and other products, wherein the system is adapted to efficiently use shelf space by storing the products on shelves that are closely spaced and densely packed with products without compromising shelf depth.

SUMMARY OF THE INVENTION

The present invention solves the above-described problems and provides a distinct advance in the art of automatic medicament dispensing systems. More particularly, the present invention provides a medicament dispensing system configured for storing and dispensing a variety of pre-packaged pharmaceutical products, wherein the system includes a robotic arm adapted to reach onto a shelf to engage a product while requiring very little lateral and vertical space to operate, thus allowing the products to be stored in close proximity to each other on closely-spaced shelves. The system of the present invention may also be used to store and dispense pre-filled bottles orvials of medicaments filled by an automatic medicament dispensing system such as the SP 200 medicament dispensing system manufactured and sold by ScriptPro LLC of Mission, Kans.

In one embodiment, the invention includes a robotic arm for transporting products in a product storage and dispensing system. The arm comprises a base plate presenting an arcuate channel, a first arm segment rotatably attached to the base plate, and a second arm segment. A first portion of the second arm segment slidably engages the arcuate channel and a second portion rotatably attaches to the first arm segment. When the first arm segment is rotated from a first position to a second position the second arm segment moves from a position substantially parallel with a first axis of the robotic arm to a position substantially parallel with a second axis of the robotic arm, and when the first arm segment is rotated from the second position to a third position the second arm segment remains substantially parallel with the second axis and extends over an edge of the base plate. The arm further includes an engagement mechanism for engaging a product, wherein the mechanism is secured to a third portion of the second arm segment.

In another embodiment, the robotic arm comprises a base plate presenting an arcuate cam track, a first orientation sprocket fixedly secured to the base plate, a first arm segment rotatably attached to the base plate, and a second arm segment rotatably secured to the first arm segment. A cam follower is secured to a first portion of the second arm segment for following the cam track, so that rotating the first arm segment from a first position to a second position causes the second arm segment to move from a position substantially parallel with a first axis of the robotic arm to a position substantially parallel with a second axis of the robotic arm, and rotating the first arm segment from the second position to a third position causes the second arm segment to remain substantially parallel with the second axis and to extend over an edge of the base plate.

The arm further comprises a second orientation sprocket rotatably secured to a second portion of the first arm segment, a third orientation sprocket rotatably secured to a third portion of the second arm segment and fixedly secured to the second orientation sprocket, and a platform for engaging a product. The platform is pivotally secured to a fourth portion of the second arm segment and is fixedly attached to a fourth orientation sprocket. A first drive chain entrains the first orientation sprocket and the second orientation sprocket, and a second drive chain entrains the third orientation sprocket and the fourth orientation sprocket.

In another embodiment, the robotic arm includes a base plate presenting a cam track with a first arcuate track segment and a second arcuate track segment, wherein each track segment has a constant radius of curvature. A base pivot shaft is fixedly secured to and extends through the base plate, wherein a first orientation sprocket is fixedly secured to an end of the base pivot shaft distal the base plate. A first end of a first arm segment is rotatably attached to the base pivot shaft between the base plate and the first orientation sprocket and an arm pivot shaft is rotatably secured to a second end of the first arm segment.

A second arm segment is rotatably secured to the arm pivot shaft and includes a cam follower rotatably secured to a first end of the second arm segment for engaging and following the cam track. Rotating the first arm segment from a first position to a second position causes the arm pivot shaft to follow a curved path while the second arm segment remains tangential to the path and moves from a position substantially parallel with a lateral axis of the robotic arm to a position substantially parallel with a longitudinal axis of the robotic arm. Rotating the first arm segment from the second position to a third position the second causes the second arm segment to remain substantially parallel with the longitudinal axis and to extend over a back edge of the base plate.

A second orientation sprocket is fixedly secured to a top end of the arm pivot shaft, and a third orientation sprocket is fixedly secured to a bottom end of the arm pivot shaft. A platform is pivotally secured to a second end of the second arm segment and includes a plurality of tines for supporting a product. A fourth orientation sprocket is fixedly attached to the platform. A first drive chain entrains the first orientation sprocket and the second orientation sprocket, and a second drive chain entrains the third orientation sprocket and the fourth orientation sprocket. An electric motor is secured to the base plate and is drivingly connected to the first arm segment, and an encoder indicates a position of the first arm segment.

In another embodiment, the invention includes a storage and dispensing system for storing and dispensing products. The system includes a substantially enclosed cabinet sized and configured to be mounted within a building and a plurality of shelves mounted within the cabinet, wherein each shelf is configured to hold at least one product. An infeed conveyor receives products that are to be stored in the cabinet, and an outfeed conveyor receives products that are to be dispensed from the cabinet.

A transporter is enclosed by and moveable within the cabinet. The transporter transports products between the infeed conveyor and the shelves and between the shelves and the outfeed conveyor for storing products in or dispensing products from the cabinet. The transporter includes a robotic arm with a first arm segment rotatably attached to a second arm segment, wherein rotating the first arm segment from a first position to a second position causes the second arm segment to move from a position substantially parallel with a first axis of the arm to a position substantially parallel with a second axis of the arm. Rotating the first arm segment from the second position to a third position causes the second arm segment to remain parallel with the second axis and to extend toward a back of the cabinet. A control system controls the operation of the infeed conveyor, the outfeed conveyor, and the transporter.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 2:
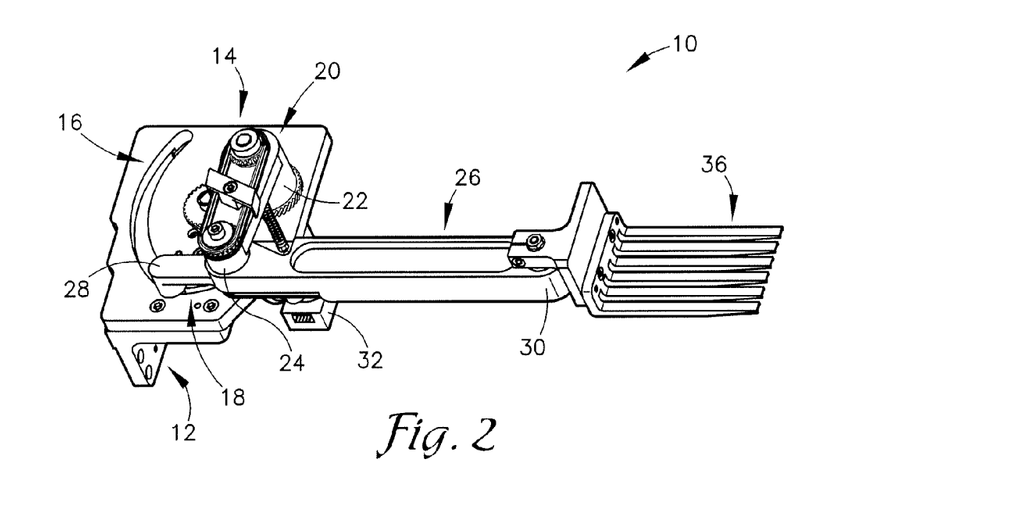
FIG. 2 is a perspective view of a robotic arm constructed in accordance with a preferred embodiment of the invention.
Figure 3:
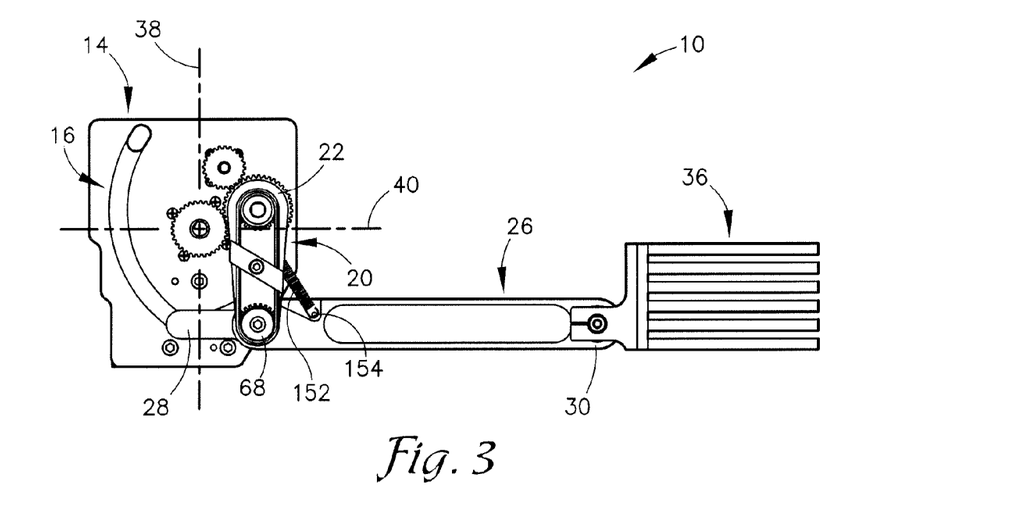
FIG. 3 is a plan view of the robotic arm of FIG. 2.
Figure 4:
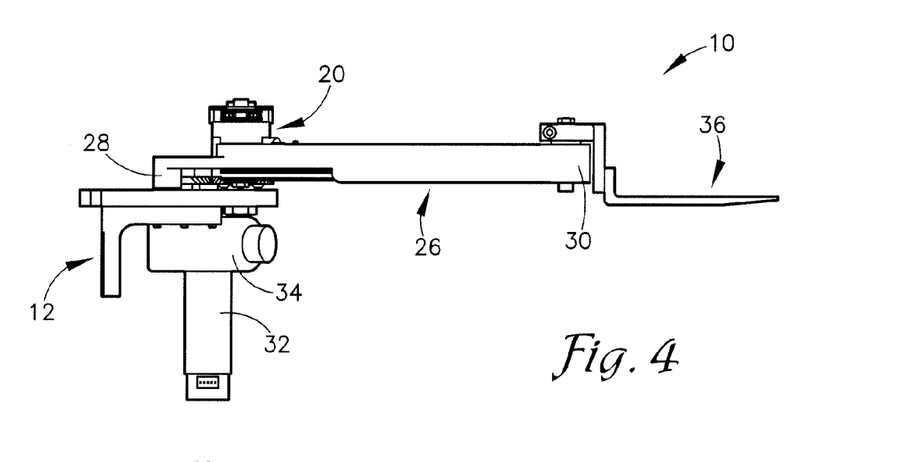
FIG. 4 is a side elevation view of the robotic arm of FIG. 2.

Referring initially to FIGS. 2-4, an exemplary robotic arm employing the principles of the present invention is shown and designated generally by the reference numeral 10. The arm 10 generally engages and transports products as part of a product storage and dispensing system. The arm 10 broadly comprises a base plate mounting bracket 12; a base plate 14 with a first cam track segment 16 and second cam track segment 18; a first arm segment 20 with a first end 22 and a second end 24; a second arm segment 26 with a first end 28 and a second end 30; a motor 32; an encoder 34; and a platform 36. A lateral axis 38 and a longitudinal axis 40 of the arm 10 are also shown in FIG. 3.

Figure 5:
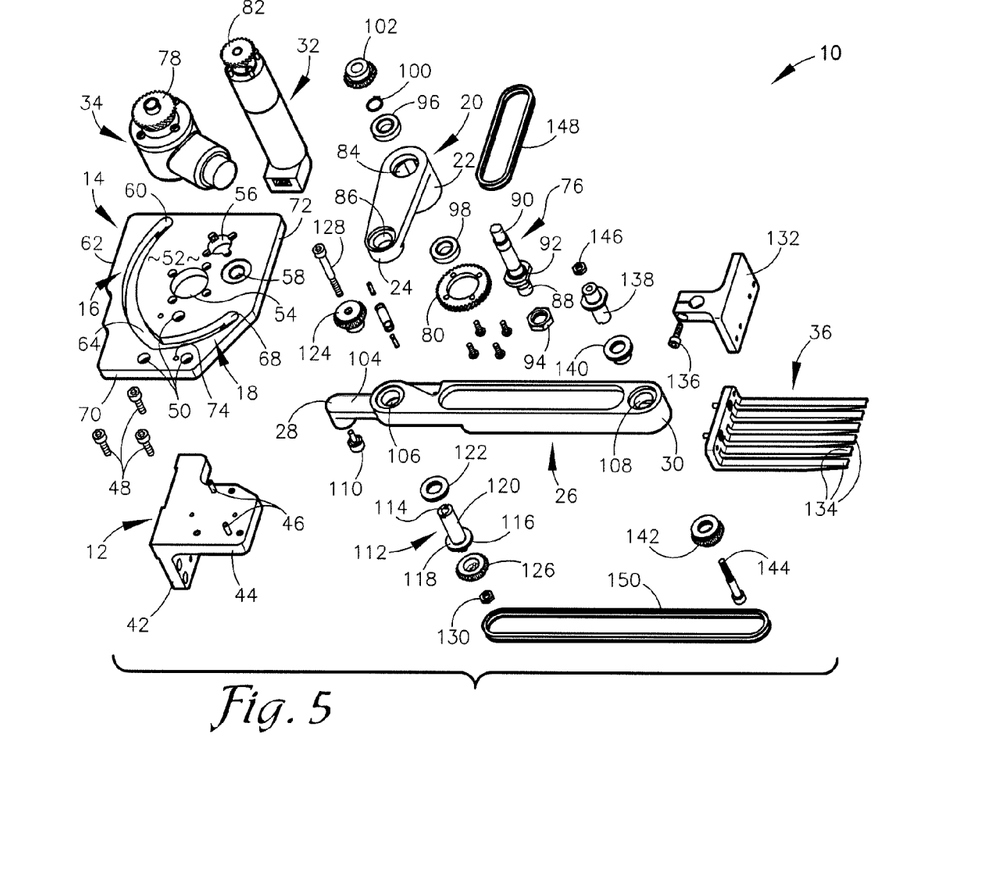
FIG. 5 is an exploded perspective view of the robotic arm of FIG. 2.

The various components of the robotic arm 10 are more clearly illustrated in the exploded perspective view of FIG. 5. The base plate mounting bracket generally secures the base plate 14 to a drive assembly 202 or other structural element of a product storage and transport system 200 (see FIG. 6). The illustrated base plate mounting bracket 12 includes a vertical bracket segment 42 and a horizontal bracket segment 44, wherein an edge of the vertical segment 42 is integrally joined with an edge of the horizontal segment 44 so that the bracket 12 generally presents an L-shaped cross section. The vertical bracket segment 42 presents one or more apertures for attaching the vertical segment 42 to the drive assembly 202, and the horizontal bracket segment 44 presents one or more apertures for attaching the horizontal segment 44 to the base plate 14. The horizontal bracket segment 44 further includes a plurality of posts 46 for guiding and securing the alignment of the horizontal segment 44 with the base plate 14.

One or more base plate mounting bracket fasteners 48 secure the base plate mounting bracket 12 to the base plate 14. The fasteners 48 are preferably bolts that extend through mounting bracket fastener receptacles 50 of the base plate 14 and through the apertures of the horizontal bracket segment 44. Each fastener 48 includes a head portion that is seated below a top surface 52 of the base plate 14 when the fastener 48 is secured to the base plate 14 and the mounting bracket 12, thus preventing the fasteners 48 from interfering with, for example, the motion of the first arm segment 20 and the second arm segment 26. The present invention is not limited to the preferred base plate mounting bracket 12 described and illustrated herein, but further contemplates, for example, one or more mounting brackets of various sizes and shapes secured to the base plate 14 by any number of means including, for example, bolting, riveting and/or welding.

The base plate generally provides a foundation on which the other components of the robotic arm 10 reside and that guides the movement of the second arm segment 26. The illustrated base plate 14 broadly comprises a cam track with a first cam track segment 16 and a second cam track segment 18; a plurality of mounting bracket fastener receptacles 50; an encoder receptacle 54; a motor receptacle 56; and a pivot shaft receptacle 58.

The first cam track segment 16 follows a curved path that presents a constant radius of curvature of approximately three and one-half inches, and the second cam track segment 18 also follows a curved path that presents a constant radius of curvature of approximately three inches. A first end 60 of the first cam track segment 16 is located approximately one and one-fourth inches from a front edge 62 of the base plate 14, and a second end 64 of the first cam track segment 16 is located approximately two and three-fourths inches from the front edge 62. A first end 66 of the second cam track segment 18 coincides with the second end 64 of the first cam track segment 16, and a second end 68 of the second cam track segment is located approximately five inches from the front edge 62 of the base plate 14.

Figure 9:
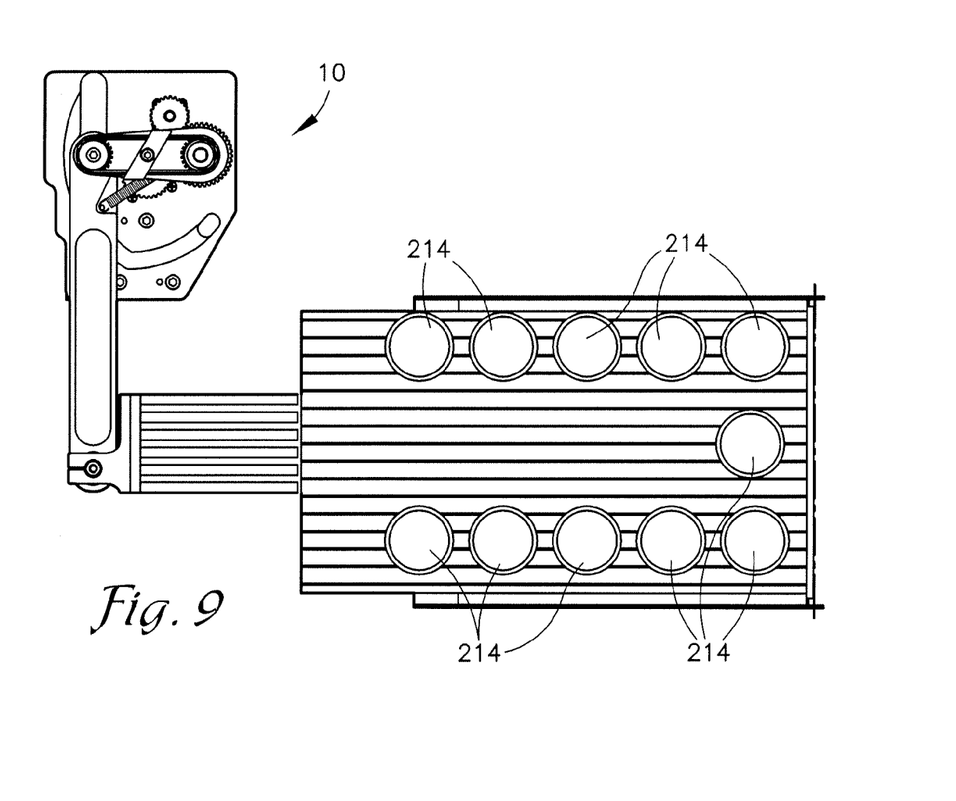
FIG. 9 is a plan view of the robotic arm of FIG. 2 in a retracted position, wherein a platform of the arm is aligned with a shelf of the transport and storage system of FIG. 6.
Figure 10:
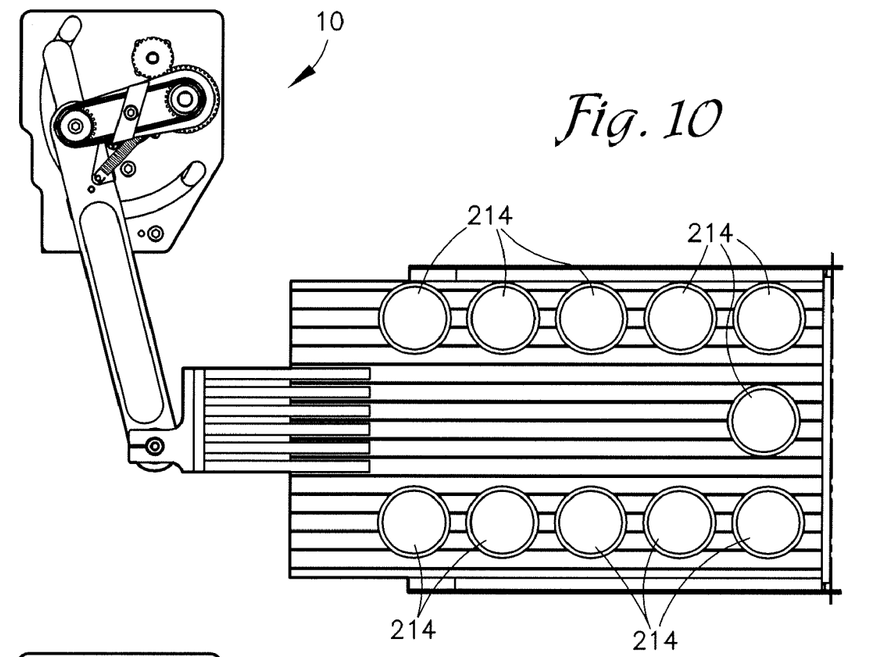
FIG. 10 is a plan view of the robotic arm and shelf of FIG. 9, wherein the arm is in a first intermediate position between the retracted position of FIG. 9 and an extended position of FIG. 19, and the platform of the arm is aligned with the shelf to engage a product residing on the shelf.
Figure 11:
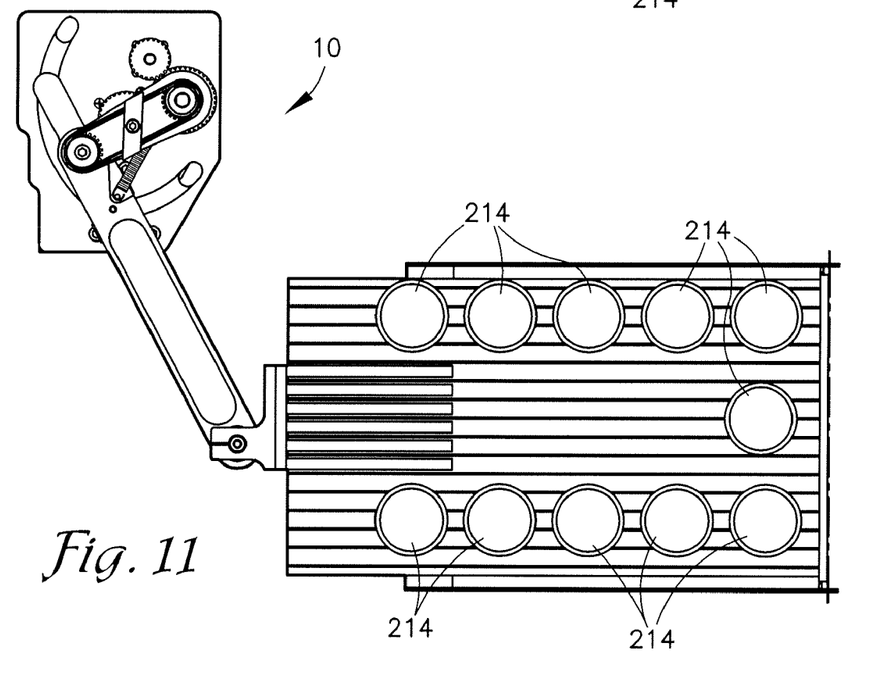
FIG. 11 is a plan view of the robotic arm and shelf of FIG. 9, wherein the arm is in a second intermediate position between the retracted position of FIG. 9 and an extended position of FIG. 19, and the platform of the arm is aligned with the shelf to engage a product residing on the shelf.
Figure 12:
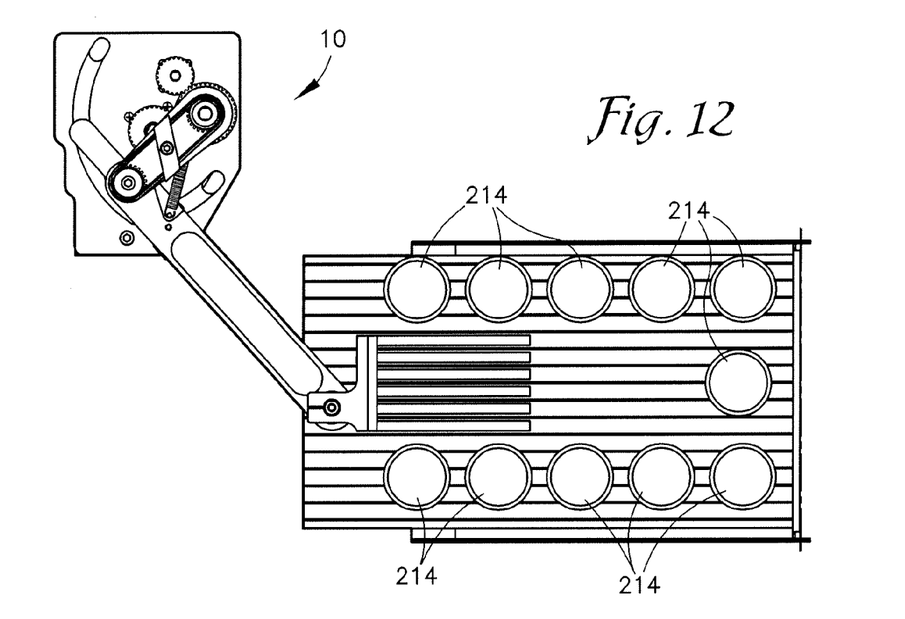
FIG. 12 is a plan view of the robotic arm and shelf of FIG. 9, wherein the arm is in a third intermediate position between the retracted position of FIG. 9 and an extended position of FIG. 19, and the platform of the arm is aligned with the shelf to engage a product residing on the shelf.
Figure 13:
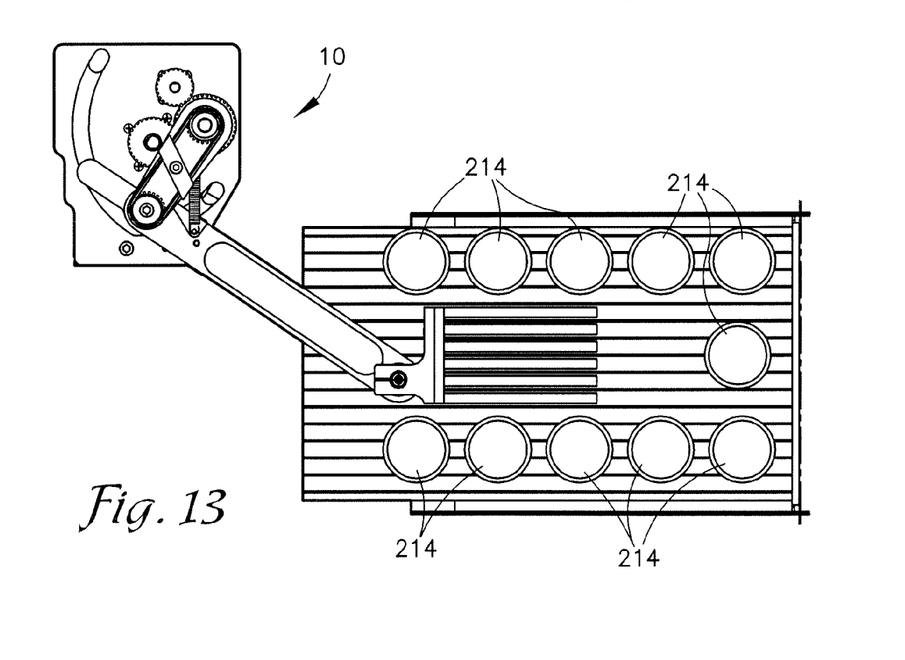
FIG. 13 is a plan view of the robotic arm and shelf of FIG. 9, wherein the arm is in a fourth intermediate position between the retracted position of FIG. 9 and an extended position of FIG. 19, and the platform of the arm is aligned with the shelf to engage a product residing on the shelf.
Figure 14:
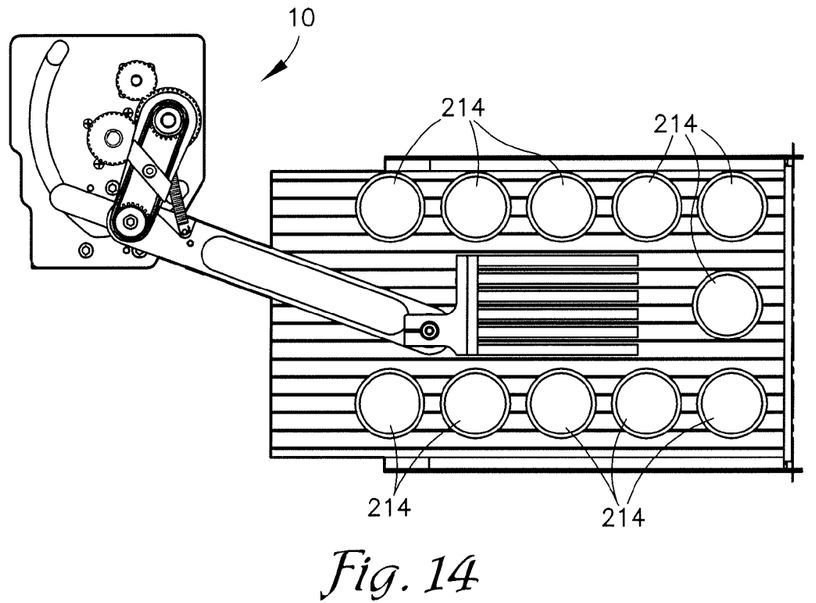
FIG. 14 is a plan view of the robotic arm and shelf of FIG. 9, wherein the arm is in a fifth intermediate position between the retracted position of FIG. 9 and an extended position of FIG. 19, and the platform of the arm is aligned with the shelf to engage a product residing on the shelf.
Figure 15:
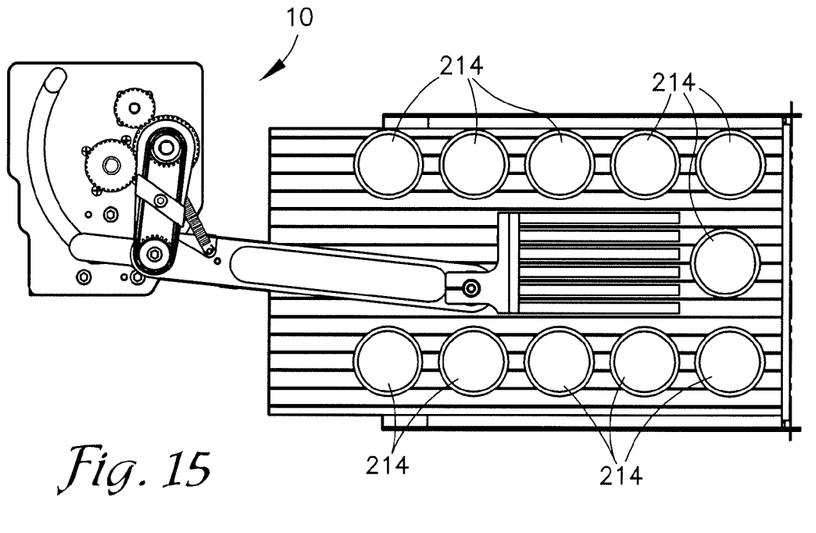
FIG. 15 is a plan view of the robotic arm and shelf of FIG. 9, wherein the arm is in a sixth intermediate position between the retracted position of FIG. 9 and an extended position of FIG. 19, and the platform of the arm is aligned with the shelf to engage a product residing on the shelf.
Figure 16:
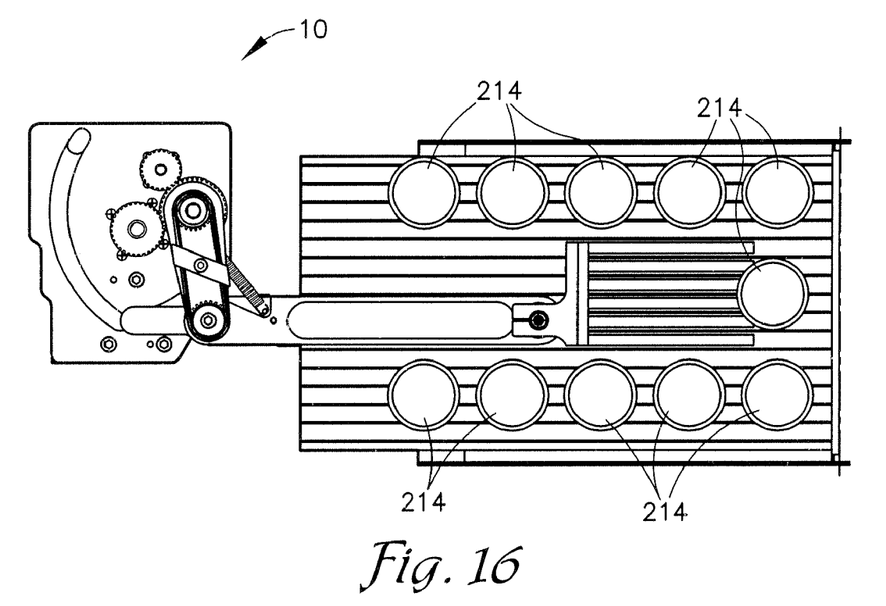
FIG. 16 is a plan view of the robotic arm and shelf of FIG. 9, wherein the arm is in a seventh intermediate position between the retracted position of FIG. 9 and an extended position of FIG. 19, and the platform of the arm is aligned with the shelf to engage a product residing on the shelf.
Figure 17:
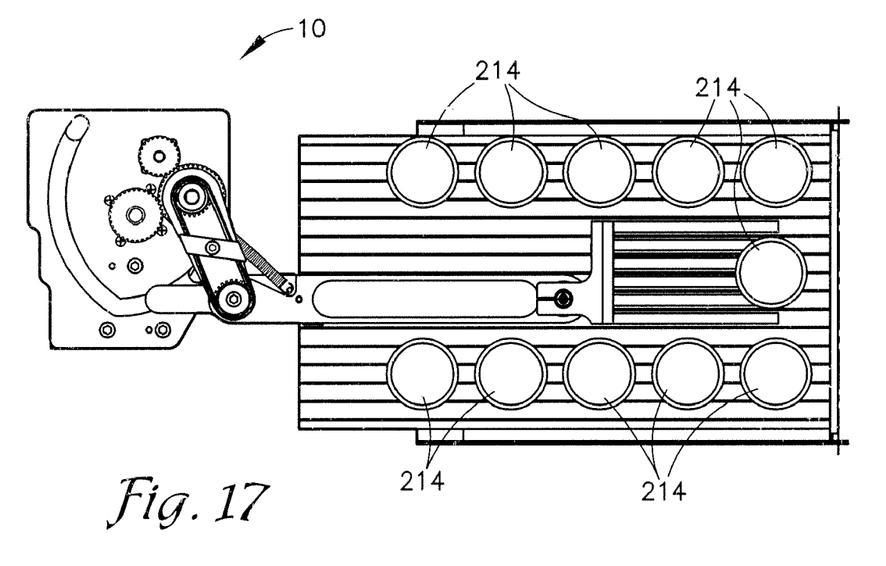
FIG. 17 is a plan view of the robotic arm and shelf of FIG. 9, wherein the arm is in an eighth intermediate position between the retracted position of FIG. 9 and an extended position of FIG. 19, and the platform of the arm is aligned with the shelf to engage a product residing on the shelf.
Figure 18:
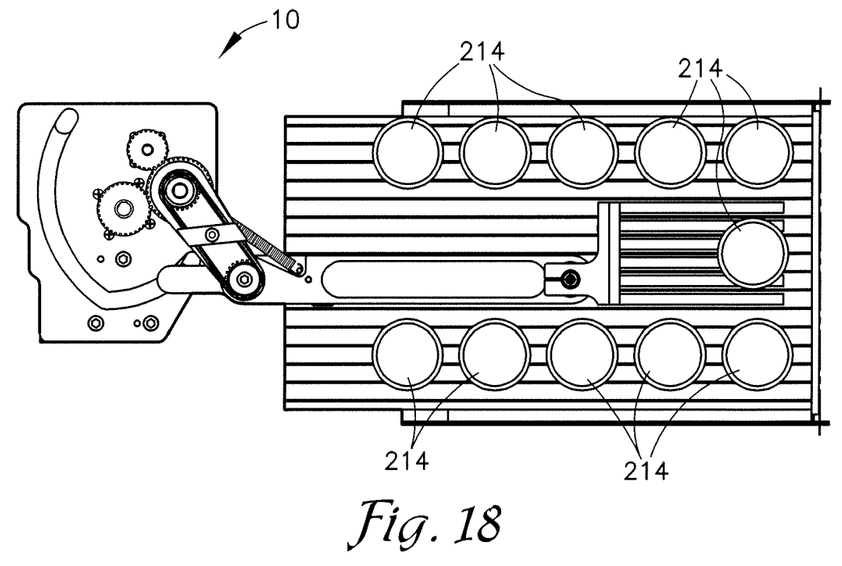
FIG. 18 is a plan view of the robotic arm and shelf of FIG. 9, wherein the arm is in a ninth intermediate position between the retracted position of FIG. 9 and an extended position of FIG. 19, and the platform of the arm is aligned with the shelf to engage a product residing on the shelf.
Figure 19:
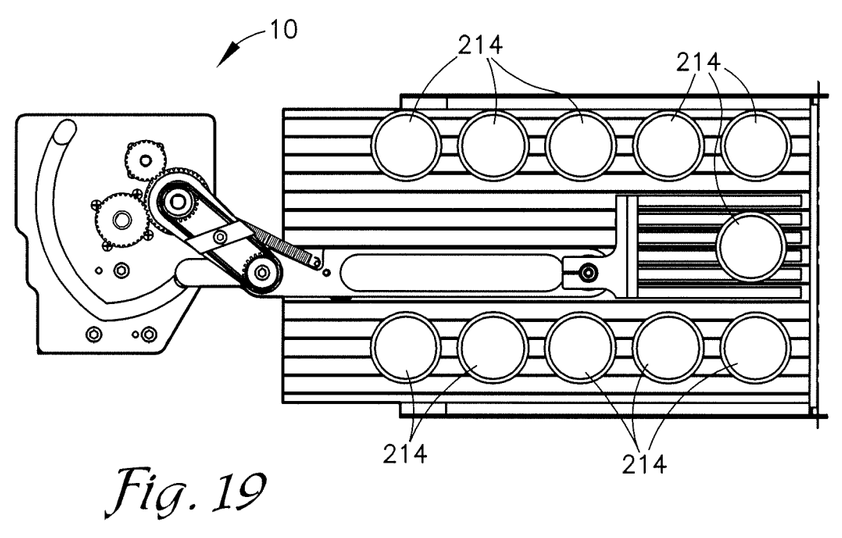
FIG. 19 is a plan view of the robotic arm and shelf of FIG. 9, wherein the arm is in an extended position and the platform is below the product on the shelf.

Generally, the cam track segments 16, 18 guide the movement of the second arm segment 26 so that the platform 36 moves from a retracted position (see FIG. 9) to an extended position (see FIG. 19) with minimal lateral movement. More particularly, as the first arm segment 20 rotates from a first position to a second position the first cam track segment 16 guides the movement of the second arm segment 26 so that it moves from a position substantially parallel with the lateral axis 38 of the robotic arm 10 and extending over a side edge 70 of the base plate 14, as depicted in FIG. 9, to a position substantially parallel with the longitudinal axis 40 of the robotic arm 10 and extending over a back edge 72 of the base plate 14, as depicted in FIG. 16. As the first arm segment 20 rotates from the second position to a third position, the second cam track segment 18 guides the second arm segment 26 so that the second end 30 of the arm segment 26 extends farther over the back edge 72 of the base plate 14 while remaining substantially aligned with the longitudinal axis 40 of the base plate 14. The motion of the arm segments 20,26 is described below in greater detail.

The mounting bracket fastener receptacles 50 receive the base plate mounting bracket fasteners 48, wherein the fasteners 48 are inserted into apertures of the base plate mounting bracket 12 and secure the bracket 12 to the base plate 14. Each of the receptacles 50 preferably includes a recessed annular shoulder against which fastener heads are seated when the fasteners 48 are secured in place, wherein the fastener heads are flush with or below the top surface 52 of the plate 14 to prevent the fasteners from interfering with, for example, movement of the first arm segment 20 and the second arm segment 26. Post receptacles 74 mate with the posts 46 of the base plate mounting bracket 12 to maintain the bracket 12 in proper alignment with the base plate 14.

The pivot shaft receptacle 58 receives a base pivot shaft 76 (described below in greater detail) and maintains the base pivot shaft 76 in a fixed position relative to the base plate 14, wherein the first arm segment 20 mates with and pivots about the base pivot shaft 76. The pivot shaft receptacle 58 includes a recessed annular shoulder in which a bushing, bearing assembly or other such element is seated. A center of the pivot shaft receptacle 58 is located approximately four and three-eighths inches from the front edge 62 of the base plate 14 and approximately four and one-eighth inches from the side edge 70.

The encoder receptacle 54 receives the encoder 34 and maintains the encoder 34 in a fixed position relative to the base plate 14 wherein an encoder gear 78 is fixed above the top surface 52 of the base plate 14 in a position to engage a gear 80 of the first arm segment 20, as explained below in greater detail. Four encoder fastener receptacles are equally spaced about a circumference of the encoder receptacle 54 to receive encoder fasteners, such as bolts or screws. The encoder fastener receptacles are similar to the mounting bracket fastener receptacles 50 but smaller in size.

The motor receptacle 56 receives the motor 32 and maintains the motor 32 in a fixed position relative to the base plate 14 wherein a drive gear 82 of the motor 32 is fixed above the top surface 52 of the base plate 14 in a position to engage the gear 80 of the first arm segment 20, as explained below in greater detail. Four motor fastener receptacles are equally spaced about a circumference of the motor receptacle 56 to receive motor fasteners, such as bolts or screws. The present invention is not limited to the preferred base plate 14 described and illustrated herein, but further contemplates, for example, a base plate with one or more cam track segments of non-uniform radius of curvature.

The first arm segment generally pivots about the base pivot shaft 76 in response to action by the motor 32 and moves the second arm segment 26 along the first and second cam track segments 16, 18. The illustrated first arm segment 20 comprises a first end 22 with a first pivot shaft receptacle 84; a second end 24 with a second pivot shaft receptacle 86; and the gear 80 secured to the first end 22. The first pivot shaft receptacle 84 is defined by a cylindrical side wall that extends from a top of the first arm segment 20 to the gear 80. The second pivot shaft receptacle 86 is likewise defined by a cylindrical side wall and includes an upper annular shoulder and a lower annular shoulder (not shown), each recessed within the side wall for receiving, for example, bushings, washers, thrust bearings, etc. A center of the first pivot shaft receptacle 84 is approximately three inches from a center of the second pivot shaft receptacle 86. The gear 80 is secured to a bottom of the first end 22 by a plurality of gear fasteners that secure to the arm segment 20 via gear fastener receptacles spaced evenly about the gear 80.

The base pivot shaft generally pivotally secures the first arm segment 20 to the base plate 14, allowing the first arm segment 20 to pivot about the first end 22 thereof. The illustrated base pivot shaft 76 includes a first end 88, a second end 90, and a flange 92 located near the first end 88. The first end 88 is inserted through the pivot shaft receptacle 58 from the top surface 52 of the base plate 14 so that the flange 92 is seated within the receptacle 58 and against the recessed annular shoulder of the receptacle 58. The pivot shaft 76 is secured in place by a nut 94 that is threaded onto the first end 88 of the pivot shaft 76. The first arm segment 20 is then seated on the base pivot shaft 76 by sliding the first pivot shaft receptacle 84 over the second end 90 of the pivot shaft 76. Bearings, bushings, or other such elements, such as shielded ball bearings 96,98, may be included to guide the movement of the arm segment 20 about the pivot shaft 76 and to reduce friction. A snap ring 100 secures the first arm segment 20 onto the pivot shaft 76. A first orientation sprocket 102 is fixedly attached to the second end 90 of the pivot shaft 76 so that the orientation of the sprocket 102 remains fixed relative to the base plate 14. The function of the sprocket 102 is described below in greater detail.

The second arm segment generally carries the platform 36, is actuated by the first arm segment 20, and is guided in its movement by the cam track segments 16, 18. The illustrated second arm segment 26 comprises a first end 28 presenting a guide bar 104; a first pivot shaft receptacle 106 proximate the first end 28; a second end 30 with a second pivot shaft receptacle 108; and a cam track follower 110 rotatably fixed to the first end 28. The first pivot shaft receptacle 106 is defined by a cylindrical side wall and presents a recessed annular shoulder against which a bushing, bearing or other such element is seated. The first pivot shaft receptacle 106 receives an arm pivot shaft 112, as explained below in greater detail. The second pivot shaft receptacle 108 is also defined by a cylindrical side wall and presents a recessed annular shoulder against which a bushing, bearing or other such element is seated and receives a platform pivot shaft 114, as explained below in greater detail. A center of the first pivot shaft receptacle 106 is spaced from a center of the second pivot shaft receptacle 108 approximately nine inches. The cam track follower 110 is rotatably fixed to an end of the guide bar 104 and extends downward to engage the cam track segments 16, 18 while the arm segment 26 is spaced above the top surface 52 of the base plate 14. Thus, the cam track follower 110 causes the first end of the arm segment 26 to follow the cam track segments 16, 18 as the arm segment 26 is moved relative to the base plate 14.

The arm pivot shaft generally pivotally secures the first arm segment 20 to the second arm segment 26. The illustrated arm pivot shaft 112 is defined by a tubular side wall with a first end 114 and a second end 116. A flange 118 is placed near the second end 116 so that the pivot shaft 112 generally presents a cylindrical shape with a flange 118 and a shank 120. In assembly, the first end 114 of the pivot shaft 112 is inserted through a lower arm pivot assembly 122 that includes, for example, a thrust bearing and a thrust washer. The first end 114 is then inserted through a bottom of the first pivot shaft receptacle 106 of the second arm segment 26 so that a top of the flange 118 abuts against the pivot assembly 122, and the pivot assembly 122 is seated against the lower annular shoulder of the pivot shaft receptacle 106 while the shank 120 of the pivot shaft 112 extends above a top of the second arm segment 26. A second orientation sprocket 124, including washers and/or bearings, is slid over the first end 114 of the pivot shaft 112 and seated against the upper annular shoulder of the second pivot shaft receptacle 86 of the first arm segment 20. A third orientation sprocket 126 is fitted over the second end 116 of the shaft 112 so that it abuts a bottom of the flange 116. A bolt 128 is inserted through the second orientation sprocket 124, arm pivot shaft 112, and the third orientation sprocket 126 and is secured in place by a nut 130.

The present invention is not limited to the preferred arm segments 20,26 and pivot shafts 76, 112, 138 described and illustrated herein, but further contemplates, for example, arm segments of various lengths and shapes interconnected at various points of articulation by any of various means including, for example, one or ball-and-socket joints.

The platform generally engages products and retains the products during transport. The illustrated platform 36 comprises a back plate 132 and an array of parallel tines 134 extending from the back plate 132. The back plate 132 pivotally secures the platform 36 to the second end 30 of the second arm segment 26 and provides a barrier against which products or other items may abut. The back plate 132 includes an aperture and bolt 136 for fixedly securing the back plate to the platform pivot shaft 138, described in greater detail below.

The illustrated tines 134 are substantially parallel and spaced to fit between vertical walls 204 of a shelf 206 (see FIG. 7) of a unit product storage and dispensing system 200. Products are stored on the walls 204 so that the platform 36 engages a product by sliding the tines between the walls 204 and below the product, then raising the tines to lift the product away from the walls 204. This process is illustrated in FIGS. 9-19. When the product is resting on the tines 134, the product is transported by moving the platform 36 via the arm segments 20,26 and/or the drive assembly 202. The present invention is not limited to the preferred platform 36 described and illustrated herein, but further contemplates, for example, a mechanism for gripping one or more products.

The back plate 132 is fixedly secured to the platform pivot shaft 138, which is rotatably secured to the second pivot shaft receptacle 108 of the second arm segment 26 in a manner substantially similar to that of the arm pivot shaft 112. The platform pivot shaft 138 may mate with, for example, a pivot assembly 140 that includes a thrust bearing, bushing, and/or other elements to guide rotation and reduce friction. A fourth orientation sprocket 142, and corresponding washers and/or bearings, also mates with the pivot shaft 138 below the second arm segment 26. A bolt 144 and nut 146 secure the pivot shaft 138, pivot assembly 140, and orientation sprocket 142 to the second end 30 of the second arm segment 26.

The various orientation sprockets 102, 124, 126, 142 serve to maintain the platform 36 in a position so that the tines 134 are aligned with the longitudinal axis 40 of the robotic arm 10. The first orientation sprocket 102 remains fixed relative to the base plate 14, as explained above, and the fourth orientation sprocket 142 is fixed relative to the platform 36. The second orientation sprocket 124 is fixed relative to the third orientation sprocket 126 via the arm pivot shaft 112. A first drive chain 148 entrains the first and second orientation sprockets 102, 124 so that the second sprocket 124 retains a fixed orientation relative to the first sprocket 102. A second drive chain 150 entrains the third and fourth orientation sprockets 126, 142 so that the fourth sprocket 142 retains a fixed orientation relative to the third sprocket 126. Thus, as the arm segments 20,26 are rotated, the fourth sprocket 142 retains a fixed orientation relative to the first sprocket 102. Because the first sprocket 102 is fixed relative to the base plate 14 and the fourth sprocket 142 is fixed relative to the platform 36, the platform 36 retains a fixed orientation relative to the base plate 14 as the arm segments 20,26 are rotated. One or more drive chain guards may be employed to protect the drive chains from falling products or other debris.

The motor generally responds to control signals by rotating the motor drive gear 82 in one of two directions to actuate the first arm segment 20. The illustrated motor 32 is a servo motor that secures to the base plate 14 via a plurality of motor fasteners, so that the motor drive gear 82 is fixed above the top surface 52 of the base plate 14 and engages the gear 80 of the first arm segment 20. Electrical contacts provide a path for power and control signals to be communicate to and from the motor 32. While various different types of motors may be used with the present invention, a servo motor is particularly suited for use with the robotic arm 10 because of the precision with which servo motors may be controlled via digital control signals.

The encoder generally interfaces a control system 208 of the storage system 200 (see FIG. 6) to the robotic arm 10 by indicating a current position of the first arm segment 20. The illustrated encoder 34 is an absolute rotary encoder and is secured to the base plate 14 via a plurality of encoder fasteners so that the encoder 34 generally resides below the plate 14 while an encoder gear 78 is fixed above the top surface 52 of the plate 14 and engages the gear 80 of the first arm segment 20. The encoder 34 is operable to assign an exact, unique position value to each angular position of the encoder gear 78 and, thus, to each angular position of the first arm segment 20.

As the first arm segment 20 rotates about the base pivot shaft 76, the gear 80 of the arm segment 20 causes the encoder gear 78 to rotate. Thus, the encoder 34 determines the position of the first arm segment 20 according to the position of the encoder gear 78 and reports the position of the first arm segment 20 to the control system 208. This is particularly useful, for example, upon startup wherein the control system 208 requires data relating to the position of the first arm segment 20 to begin actuating the arm 10. It will be appreciated that various methods may be used to determine positions of the first arm segment 20 and/or the second arm segment 26 including, for example, tactile or electronic trip switches.

A bias spring 152 (see FIG. 3) is employed to bias the cam track follower 110 against an outer edge of the first cam track segment 16 and the second cam track segment 18. The spring 152 is preferably an extension spring that extends between a first spring post (not shown) mounted on the base plate 14 proximate the pivot shaft receptacle 58 and a second spring post 154 mounted on the second arm segment 26 near the first pivot shaft receptacle 106. The bias spring 152 thus pulls the second arm segment 26 in a manner to encourage it to rotated counterclockwise about the arm pivot shaft 112, which in turn causes the cam track follower 110 to press against the outer edge of the cam track segments 16, 18. The present invention contemplates the use of any of various methods to bias the cam track follower 110 against an edge of the cam track segments 16, 18 including, for example, a torsion spring secured to the second arm segment 26 and engaged with the arm pivot shaft 112.

Figure 6:
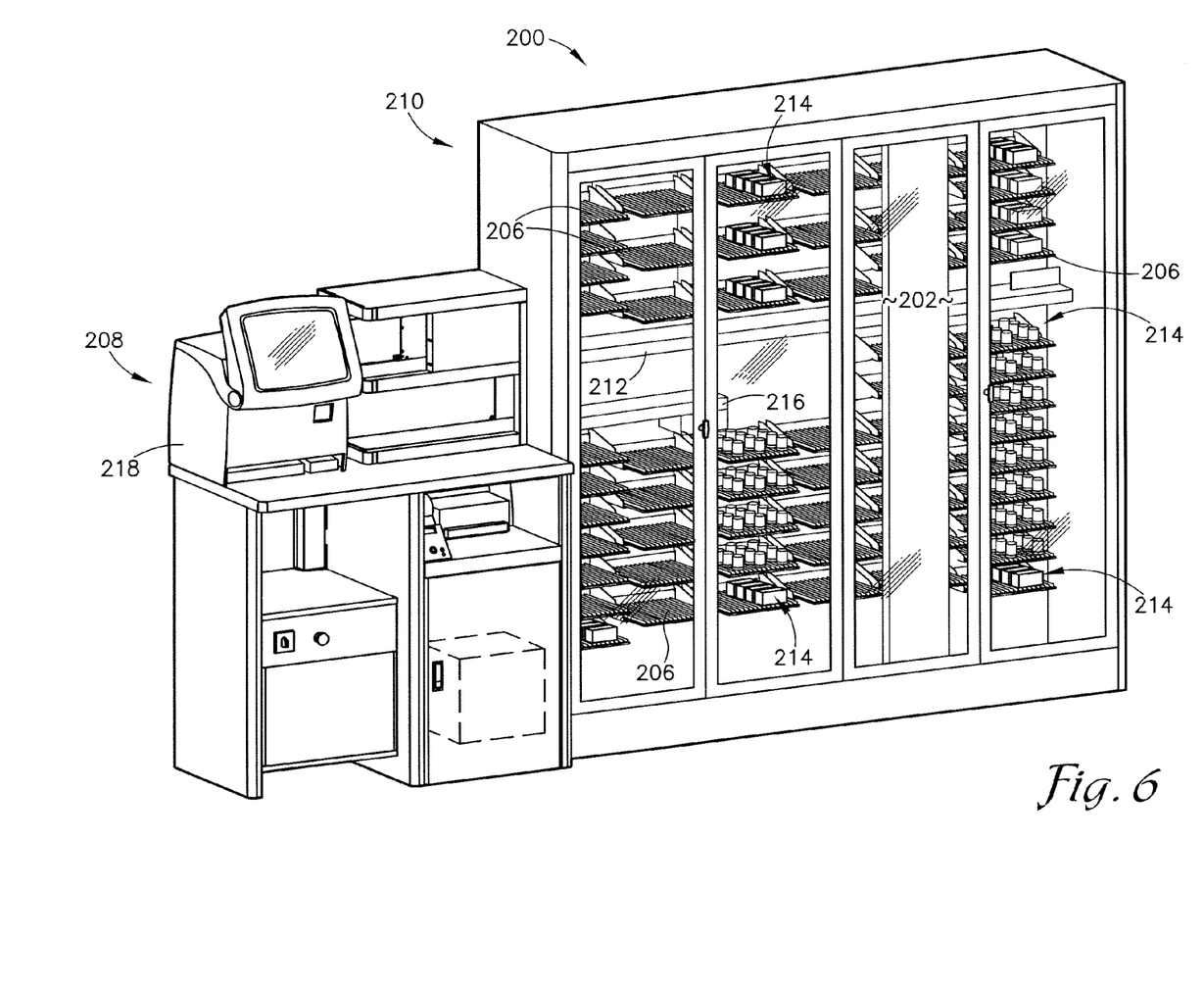
FIG. 6 is a perspective view of a pharmaceutical unit of use transport and storage system suitable for use with the robotic arm of FIG. 2.
Figure 7:
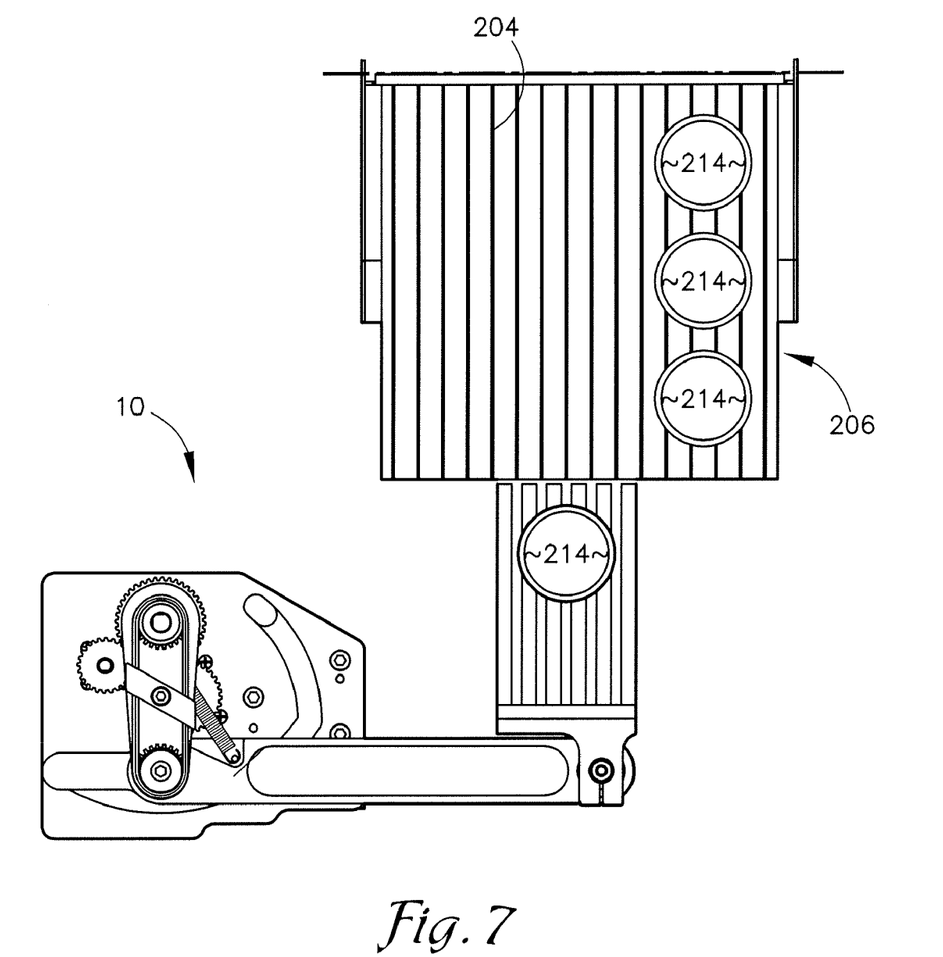
FIG. 7 is a plan view of the robotic arm of FIG. 2, wherein the arm is shown aligned with a shelf of the transport and storage system of FIG. 6 and carrying a product to be placed on the shelf.
Figure 8:
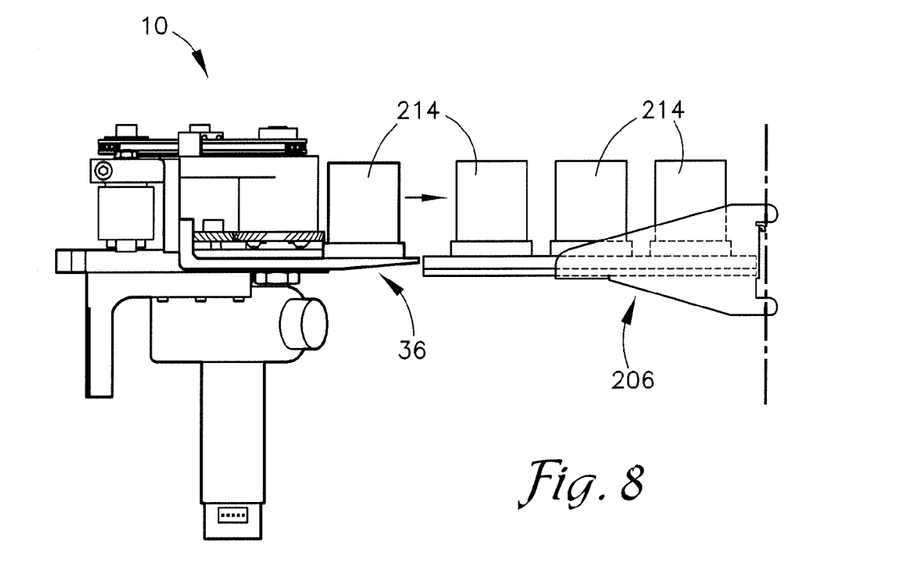
FIG. 8 is side elevation view of the robotic arm, product, and shelf of FIG. 7.

The robotic arm assembly 10 is preferably used as part of a transport storage system for pharmaceutical unit of use dispenser 200 illustrated in FIGS. 6-8. The storage system 200 is described in detail in co-pending U.S. Patent Application "FORK BASED TRANSPORT STORAGE SYSTEM FOR PHARMACEUTICAL UNIT OF USE DISPENSER", Ser. No. 10/896,477, filed Jul. 22, 2004 and incorporated by reference into the present application. In addition to the drive assembly 202, shelves 206, and control system 208 described above, the storage system 200 broadly includes a cabinet 210 for enclosing the shelves 206; an infeed conveyor 212 for transporting products 214 into the cabinet 210; and an outfeed conveyor 216 for transporting the products 214 out of the cabinet 210. The drive assembly 202 is moveable within the cabinet 210 and transports the products 214 between the shelves 206 and the infeed and outfeed conveyors 212,216. The control system 208 controls operation of the conveyors 212,216 and the drive assembly 202 in response to prescriptions received from a host computer 218. The drive assembly 202 and the robotic arm 10 together comprise a transporter. The structure and function of each of these elements is described in detail in the above-referenced co-pending patent application.

In use, an operator may use the control system 208 to select from various operating modes, including load only, store only, dispense only, dispense and store, and dispense and load. In the load only mode, the system 200 receives products 214 to be stored in the cabinet 210 and keeps them on the infeed conveyor 212. In the store only mode, the system takes products off the infeed conveyor 212 and puts them on the shelves 206. In the dispense only mode, the system 200 takes products off the shelves 206 and puts them on the outfeed conveyor 216 in response to prescriptions received from the host computer 218. In the dispense and store mode, dispensing of products takes precedence over storing of products. If the system 200 has prescriptions to dispense, it completes dispensing the products 214 in response to all of the scripts that it can fill and then performs storing of the products 214. If a prescription comes in during storing, storing is postponed, and the prescription is filled. In the dispense and load mode, the system 200 dispenses and loads simultaneously because loading does not require use of the drive assembly 202. In the maintenance mode, the operator can selectively eject products from the cabinet 210.

Turning now to FIGS. 9-19, the robotic arm 10 is shown extending from a retracted position to an extended position. The movement of the arm 10 as it moves from the retracted position to the extended position can be divided into two phases, a first extension phase illustrated in FIGS. 9-16, and a second extension phase illustrated in FIGS. 16-19. FIG. 9 depicts the robotic arm 10 in a fully retracted position. In the retracted position, the first arm segment 20 is in a first position substantially parallel with the longitudinal axis 40 of the base plate 14 wherein the second end 24 of the arm segment 20 is proximate the front edge 62 of the base plate 14. The second arm segment 26 is substantially parallel with the lateral axis 38 of the base plate 14 wherein the second end 30 of the arm segment 26 extends over the side edge 70 of the base plate 14. The platform 36 is positioned so that the tines 134 are substantially parallel with the longitudinal axis 40 and are perpendicular to the second arm segment 26, pointing in a backwards direction. The cam track follower 110 is located near the first end 60 of the first cam track segment 16.

The robotic arm 10 maintains the retracted position while it is idle and while it is transporting a product to or from a product shelf. It will be appreciated that while the arm 10 is in the retracted position it requires little longitudinal operating room, that is, it requires little operating room in the direction of the longitudinal axis 40. Dedicating less space to operation of the arm 10 allows a user to dedicate more space to product shelves (i.e., deeper shelves), or to reduce the overall depth of the cabinet 210.

Referring particularly to FIGS. 9-16, during the first extension phase the first arm segment 20 rotates from the first position counterclockwise approximately ninety degrees to a second position substantially parallel with the lateral axis 38. This causes the second arm segment 26 to rotate so that the cam track follower 110 of the second arm segment 26 follows the first cam track segment 16 from the first end 60 to the second end 64 of the segment 16. The arm segments 20,26 thus rotate when the motor 32 is activated so that the motor drive gear 82 rotates in a clockwise direction. The drive gear 82 causes the first arm segment 20 to rotate counterclockwise about the base pivot shaft 76. As the first arm segment 20 rotates, the second arm segment 26 also rotates with the first arm segment 20 while the cam track follower 110 guides the movement of the first end 28 of the second arm segment 26.

In the preferred embodiment, the first cam track segment 16 guides the second arm segment 26 so that the second arm segment 26 remains perpendicular to the first arm segment 20, as can be seen in the drawings. As the first arm segment 20 rotates, the second arm segment 26 moves from a position substantially parallel with the lateral axis 38 (see FIG. 9) to a position substantially parallel with the longitudinal axis 40 (see FIG. 16). The motion of the second arm segment 26 during the first stage of arm extension may alternatively be described as a point of the second arm segment 26 (in this case, corresponding to the arm pivot shaft 112) following a curved path with the arm segment 26 remaining tangential to the curved path. In this case, the curved path corresponds to an arc of constant radius defined by the motion of the second end 24 of the first arm segment 20 as the first arm segment 20 pivots about the base pivot shaft 76. As can be seen in the drawings, as the arm 10 goes through the first extension phase, the second arm segment 26 does not interfere with products placed on either side of the platform 36.

The present invention is not limited to the base plate and arm segments as set forth above but may include arm segments of different size, shape and/or functionality. The present invention contemplates, for example, a second arm segment that does not remain perpendicular to the first arm segment during the first phase of arm extension, and that does not remain substantially parallel with the longitudinal axis during the second phase of arm extension.

Referring now to FIGS. 16-19, during the second extension phase the first arm segment 20 rotates from the second position counterclockwise approximately forty-five degrees to a third position wherein the second end 24 extends over the back edge 72 of the base plate 14. This causes the second arm segment 26 to move so that the cam track follower 110 of the second arm segment 26 follows the second cam track segment 18 from the first end 66 to the second end 68 of the segment 18. As the arm segments 20,26 thus rotate, the second arm segment 26 remains oriented substantially parallel with the longitudinal axis 40, moves away from the side edge 70 of the base plate 14, and extends over the back edge 72 of the base plate 14 so that the platform 36 moves away from the base plate 14 toward the fully extended position illustrated in FIG. 19. During the second phase the platform 36 is moved away from the base plate 14 and toward a back of the cabinet 210, and under a product 214. Once the platform 36 is under the product 214, the drive assembly 202 lifts the arm 10 upward, or toward a top of the cabinet 210, to lift the platform 36 and engage the product 214. With the product 214 resting on the platform 36 the arm 10 may be retracted to clear the vertical walls 204 of the product shelves 206, enabling the drive assembly 202 to move the arm 10 vertically, laterally, and/or horizontally to transport the product 214 to a new location.

During the first and second extension phases, the platform 36 remains oriented so that the tines 134 are substantially parallel to the longitudinal axis 40. The various orientation sprockets 102, 124, 126, 142 and the drive chains 148, 150 cooperate to maintain the rearward orientation of the tines 134, as explained above. It will be appreciated that in the preferred use of the arm 10, the rearward orientation of the tines 134 is essential to allow the tines 134 to align with gaps between the vertical walls 204 as the platform 36 is moved rearward and beneath a product. It should also be noted that the lateral operating space of the second arm segment 26 and the platform 36 is minimal, allowing products to be stored closer together and, therefore, more densely packed.

It should further be noted from FIGS. 9-19 that the platform 36 does not move laterally while the arm segments 20,26 move from the retracted position to the extended position, allowing the tines 134 of the platform 36 to fit between the walls 204 of the shelf 206. This is accomplished via control software implemented in the system 200 that directs the computer to move the drive assembly 202 to counter any lateral movement of the platform 36. For example, as the robotic arm 10 goes through the first extension phase illustrated in FIGS. 9-16, the platform 36 moves relative to the base plate 14 toward the longitudinal axis 40. To counter this lateral movement of the platform 36, the drive assembly 202 moves the base plate 14 in a direction opposite the lateral movement of the platform 36 so that the platform has no net movement in a lateral direction.

The arm 10 is retracted from the extended position to the retracted position when the first arm segment 20 is rotated clockwise so that the cam follower 110 of the second arm segment 26 follows the cam track to the first end 60 of the first cam track segment 16. This is accomplished by activating the motor 32 so that the motor drive gear 82 rotates in a counterclockwise direction. The motion of the arm 10 as it is thus retracted is substantially the reverse of the motion of the arm 10 as it is extended from the retracted position to the extended position and therefore will not be described in detail.

Having thus described the preferred embodiment of the invention, what is claimed as new and desired to be protected by Letters Patent includes the following:

1. A robotic arm for transporting products in a product storage and dispensing system, the arm comprising:
   a base plate presenting an arcuate channel;
   a first arm segment rotatably attached to the base plate;
   a second arm segment with a first portion slidably engaged with the arcuate channel and a second portion rotatably attached to the first arm segment so that when the first arm segment is rotated from a first position to a second position the second arm segment moves from a substantially retracted position to a partially extended position, and when the first arm segment is rotated from the second position to a third position the second arm segment moves from the partially extended position to a more fully extended position, wherein the second arm segment is substantially parallel with a first axis of the robotic arm when in the retracted position, and is substantially parallel with a second axis of the robotic arm when in the partially extended position; and
   an engagement mechanism secured to the second arm segment.

2. The robotic arm as set forth in claim 1, wherein the engagement mechanism is secured to a third portion of the second arm segment.

3. The robotic arm as set forth in claim 1, wherein the channel is a cam track and includes a first segment and a second segment, wherein rotating the first arm segment from the first position to the second position causes the first portion of the second arm segment to follow the first track segment so that a point of the second arm segment follows a curved path and the second arm segment remains tangential to the path.

4. The robotic arm as set forth in claim 3, wherein rotating the first arm segment from the second position to the third position causes the first portion of the second arm segment to follow the second track segment.

5. The robotic arm as set forth in claim 4, wherein each of the first and second track segments has a constant radius of curvature.

6. The robotic arm as set forth in claim 1, wherein the engagement mechanism includes a platform with a plurality of tines.

7. The robotic arm as set forth in claim 6, wherein the tines of the platform remain substantially parallel with the second axis while the first arm segment is rotated from the first position to the second position and from the second position to the third position.

8. The robotic arm as set forth in claim 1, further comprising a motor for rotating the first arm segment.

9. The robotic arm as set forth in claim 8, wherein the motor is a servo motor secured below the base plate and drivingly connected to a drive gear that resides above the base plate and engages the first arm segment.

10. The robotic arm as set forth in claim 1, further comprising an encoder for indicating a position of the first arm segment.

11. The robotic arm as set forth in claim 10, wherein the encoder is adapted to indicate a position of the first arm segment when the system is first activated.

12. The robotic arm as set forth in claim 1, further comprising a drive assembly for moving the arm vertically and horizontally within a product storage cabinet.

13. The robotic arm as set forth in claim 12, further comprising a control system adapted to move the drive assembly to counter lateral movement of the engagement mechanism as the first and second arm segments are moved from a retracted position to an extended position.

14. The robotic arm as set forth in claim 1, wherein the first axis of the robotic arm is substantially normal to the second axis of the robotic arm.

15. The robotic arm as set forth in claim 14, wherein the first axis is a lateral axis and the second axis is a longitudinal axis.

16. A robotic arm for transporting products in a product storage and dispensing system, the arm comprising:
   a base plate presenting an arcuate channel;
   a first arm segment rotatably attached to the base plate;
   a second arm segment with a first portion slidably engaged with the arcuate channel and a second portion rotatably attached to the first arm segment so that when the first arm segment is rotated from a first position to a second position the second arm segment moves from a position substantially parallel with a first axis of the robotic arm to a position substantially parallel with a second axis of the robotic arm, and when the first arm segment is rotated from the second position to a third position the second arm segment remains substantially parallel with the second axis and extends over an edge of the base plate; and an engagement mechanism for engaging a product, the mechanism secured to a third portion of the second arm segment.

17. The robotic arm as set forth in claim 16, wherein the channel is a cam track and includes a first segment and a second segment, wherein rotating the first arm segment from the first position to the second position causes the first portion of the second arm segment to follow the first track segment so that a point of the second arm segment follows a curved path and the second arm segment remains tangential to the path.

18. The robotic arm as set forth in claim 17, wherein rotating the first arm segment from the second position to the third position causes the first portion of the second arm segment to follow the second track segment.

19. The robotic arm as set forth in claim 18, wherein each of the first and second track segments has a constant radius of curvature.

20. The robotic arm as set forth in claim 16, wherein the engagement mechanism includes a platform with a plurality of tines.

21. The robotic arm as set forth in claim 20, wherein the tines of the platform remain substantially parallel with the second axis while the first arm is rotated from the first position to the second position and from the second position to the third position.

22. The robotic arm as set forth in claim 16, further comprising a motor for rotating the first arm segment.

23. The robotic arm as set forth in claim 22, wherein the motor is a servo motor secured below the base plate and drivingly connected to a drive gear that resides above the base plate and engages the first arm segment.

24. The robotic arm as set forth in claim 16, further comprising an encoder for indicating a position of the first arm segment.

25. The robotic arm as set forth in claim 24, wherein the encoder is adapted to indicate a position of the first arm segment when the system is first activated.

26. The robotic arm as set forth in claim 16, further comprising a drive assembly for moving the arm vertically and horizontally within a product storage cabinet.

27. The robotic arm as set forth in claim 26, further comprising a control system adapted to move the drive assembly to counter lateral movement of the engagement mechanism as the first and second arm segments are moved from a retracted position to an extended position.

28. The robotic arm as set forth in claim 16, wherein the first axis is a lateral axis and the second axis is a longitudinal axis.

29. A storage and dispensing system for storing and dispensing products, the system comprising:

a substantially enclosed cabinet;

a plurality of product holders mounted within the cabinet, each product holder configured for holding at least one product;

an infeed conveyor for receiving products that are to be stored in the cabinet;

an outfeed conveyor for receiving products that are to be dispensed from the cabinet;

a transporter enclosed by and moveable within the cabinet for transporting products between the infeed conveyor and the product holders and between the product holders and the outfeed conveyor for storing products in or dispensing products from the cabinet, the transporter including a robotic arm with a first arm segment rotatably attached to a second arm segment, wherein rotating the first arm segment from a first position to a second position causes the second arm segment to move from a position substantially parallel with a first axis of the arm to a position substantially parallel with a second axis of the arm, and wherein rotating the first arm segment from the second position to a third position causes the second arm segment to remain parallel with the second axis and to extend toward a back of the cabinet; and a control system for controlling operation of the infeed conveyor, the outfeed conveyor, and the transporter.

30. The storage and dispensing system as set forth in claim 29, wherein the control system moves the transporter to counter lateral movement of an end of the second arm segment so that the end does not move laterally as the first and second arm segments are moved.

* * * * *